June 9, 1936.  H. J. BAKER ET AL  2,043,944
INLET NIPPLE TRAP
Filed Jan. 26, 1933

INVENTOR
HARRY J. BAKER
BY & CHARLES NESS
ATTORNEY

Patented June 9, 1936

2,043,944

UNITED STATES PATENT OFFICE 2,043,944

INLET NIPPLE TRAP

Harry J. Baker and Charles Ness, Indianapolis, Ind., assignors, by mesne assignments, to Union Carbide and Carbon Corporation, a corporation of New York Application January 26, 1933, Serial No. 653,682

8 Claims. (Cl. 183—75)

This invention relates to traps and more particularly relates to an improved trap and inlet nipple for use with valves and fluid pressure regulators.

Gases which are supplied in cylinders for general use are ordinarily not entirely free from particles of gritty material of the kind which may be collected during manufacture or may flake off from the inside walls of the gas storage container. It has heretofore been customary to employ filters or fine mesh wire screens to separate particles of foreign matter from the gas, especially in supply lines ahead of valves and fluid pressure regulators. Such filters or screens require a considerable amount of service in order to be kept clean and to prevent obstruction to the flow of gas.

An object of this invention is to provide an improved device for use with fluid regulators and valves which will remove substantially all objectionable particles of foreign material from the fluid.

Another object of this invention is to provide a simple and inexpensive trap for use in protecting fluid regulators and valves.

Still another object of this invention is to provide, in an inlet nipple, means for entrapping foreign particles in a gas, which means may be readily cleaned and repaired.

Figure 1:
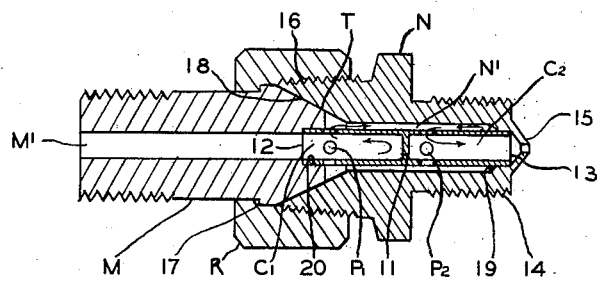
Figure 2:
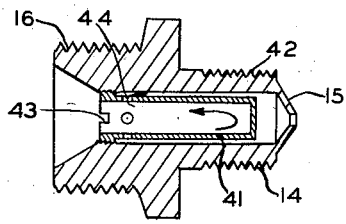
Figure 3:
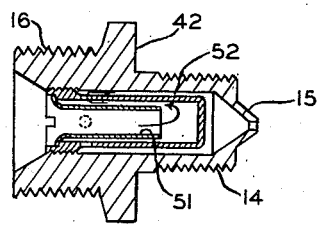
Figure 4:
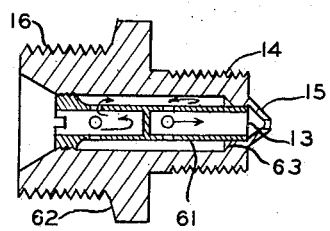

The above and other objects together with the novel features of this invention will be more evident from the following description and the accompanying drawing, of which Fig. 1 is a view in cross section illustrating a preferred embodiment of this invention; and Figs. 2, 3 and 4 show other forms of traps threadedly secured within inlet nipples.

As shown in the drawing, the devices embodying the various forms of this invention may comprises an inlet nipple having one or more cylindrical traps arranged therein so that the direction of gas flowing through the nipple passage is sharply reversed at least once in order to throw out particles of foreign matter. The particles thrown out are collected in the cylindrical traps and may be removed when the nipple is dismantled and cleaned.

Referring to Fig. 1, the preferred embodiment of this invention comprises a trap in the form of a relatively long cylinder T. The trap has an inlet 12 and an outlet 13 and may be divided by a suitable partition 11 into an inlet chamber $C_1$ and an outlet chamber $C_2$ of substantially equal size. A plurality of spaced radial ports $P_1$ and $P_2$ may be provided near the inlet 12 of the chamber $C_1$ and adjacent the partition 11 in the chamber $C_2$, respectively, for permitting gas to flow between the two chambers.

As shown in Fig. 1 the novel cylindrical trap is incorporated in an inlet nipple for supplying gas to a pressure regulating and reducing valve. The nipple may comprise two members N and M having alined gas passages N' and M'. The nipple member N is arranged to be secured to the inlet opening of a valve or pressure regulator, and for this purpose a threaded portion 14 and a nozzle outlet 15 are provided for connection with the valve.

The other end of the nipple member N is externally threaded at 16 to interfit with the similarly internally threaded portion of a rotatable nut R that bears against a shoulder 17 on the member M and draws the seating end of the member M into gas tight engagement with a countersunk seat 18 on the nipple member N.

The passage N' is of larger diameter than the trap T so that a suitable annular space is formed through which gas may flow when the trap is assembled within the nipple N. A restriction in the passage is provided near the nozzle 15 of the nipple, and the outlet end 13 of the trap is fitted therein. In order to permit the trap to be guided readily into the restriction the passage N' is provided with a beveled shoulder 19. When the nipple members M and N are assembled, a recess or counterbore 20 in the passage M' receives the inlet end 12 of the trap. The trap is thus held securely, but not permanently, within the nipple assembly and may be easily removed for cleaning.

Gas flows in through the inlet of the trap until it strikes the partition 11 where the direction of flow is reversed sharply, throwing out particles of foreign matter into the chamber $C_1$. The gas continues through the ports $P_1$ to the passage N' and again reverses direction when it strikes the shoulder 19, throwing out still further particles of foreign matter from the gas. After the second reversal the gas flows into the chamber $C_2$ through the ports $P_2$ and then passes out from the nozzle opening 15 to the regulator or valve.

The sudden reversals in the flow of gas tend to leave the heavier particles of foreign material in the chamber $C_1$ and the lighter particles in the end of the passage N'. Although the continual flow of gas agitates the particles, they are forced back against the partition 11 and the shoulder 19 by the force of the reversing gas. Only small particles of foreign material pass out through the ports $P_1$ and substantially no particles pass through the ports $P_2$ to the outlet of the nipple N.

Another form of trap may comprise a short cylinder 41 which is threadedly secured within the inlet of a nipple 42 as shown in Fig. 2. The cylinder may be open at the end facing the inlet of the nipple and closed at the end adjacent the nipple outlet so that gas will enter directly into the cylinder. The open end of the cylinder is preferably provided with diametrically opposed slots 43 for screwing the cylinder into place. Closely drilled below the screw threads on the cylinder are a number of radial ports 44 which allow the gas to flow out into the nipple passage after it has been reversed by the end wall of the cylinder.

In addition a baffle may be employed, as shown in Fig. 3 for directing the flow of gas. The baffle may comprise an open-ended cylinder 51 spaced from the inside of the trapping cylinder 52 and secured to the inlet end thereof. Gas enters the baffle cylinder 51 and passes to the closed end of the cylinder 52 where it is reversed and returned to the ports in the cylinder wall by passing back outside of the baffle. Only gas which has been rid of foreign particles by striking the end wall of the cylinder 52 is allowed to pass through the ports, the entering gas being excluded by the baffle 51.

Still another form of trap may comprise a cylinder 61 having two chambers and being threadedly secured in a nipple 62, as shown in Fig. 4. The inlet end of the trap or cylinder is provided with external threads which cooperatively engage similar internal threads in the passage of the nipple, and the outlet end of the trap is held in a comparatively tight manner in a reduced portion 63 of the nipple passage. In order to cause reversals in the flow of gas, a partition and radial ports may be provided as in the preferred form of this invention. However, when the double-chambered trap 61 is threadedly secured in the passage only a single nipple member 62 is required to complete a unitary assembly.

Although we have described a preferred embodiment of this invention and various alternative forms it will be understood that changes may be made in any of these forms without departing from the scope of this invention as defined in the appended claims.

We claim:

1. A device for removing solid particles from flowing gaseous fluids comprising the combination of a nipple having a fluid passage; and entrapping means comprising a tubular cylinder fitting tightly at one end within said passage and being axially open at said end and closed at the other end; said cylinder being provided with ports closer to the inlet end of the nipple than to said closed end and closed between said ports and said closed end.

2. A device for removing solid particles from flowing fluids comprising the combination of a nipple having a fluid passage; a cylinder extending into said passage and being spaced from the walls thereof; said nipple having means for supporting said cylinder; means including a partition in the cylinder for reversing the flow of fluid within the cylinder; and a plurality of ports in said cylinder adjacent the inlet end of the nipple.

3. A device for removing solid particles from flowing fluids comprising the combination of a nipple having a fluid passage; a cylinder supported at both ends in said passage and being spaced from the walls thereof; means for reversing the flow of fluid axially of the nipple both inside and outside said cylinder; and means including radial ports in the walls of the cylinder for redirecting the flow of fluid after contacting with said reversing means.

4. A device for removing particles from a fluid comprising a cylinder having a partition dividing said cylinder into an inlet chamber and an outlet chamber, said cylinder being provided with a plurality of ports in the wall of the cylinder nearer to the inlet end thereof than to the partition, and with a plurality of ports nearer to the partition than to the outlet of the outlet chamber; and a nipple member having a passage tightly fitting each end of said cylinder and having an expanded area within said passage, forming an annular space for the flow of fluid from the inlet chamber to the outlet chamber; the expanded area having a closed portion extending beyond the ports between the same and the outlet chamber whereby the general direction of the flow of fluid through the device is reversed therein and in said inlet chamber.

5. A device for removing solid particles from flowing fluids comprising the combination of two detachably connected members having alined fluid passages, one of said members having a counterbore, the other said member having a shoulder and a restriction in the passage; a tubular member spaced from the wall of the passage intermediate its ends, and held with a hermetically tight connection at each end within the counterbore and the restriction respectively; and means including a partition for reversing the flow of fluid axially in the tubular member; said tubular member being provided with apertures for directing the fluid through the space between said tubular member and the wall of the passage.

6. A device for removing particles from a fluid comprising a nipple having a passage therethrough; means within said passage including a partition in the passage for sharply reversing the general direction of flow of fluid at least once; and means including a single row of ports remote from and a single row of ports adjacent said reversing means respectively on opposite sides of the partition, for retarding particles in the fluid and redirecting the flow of the fluid.

7. A device for removing solid particles from flowing fluids comprising the combination of two detachably connected members having alined fluid passages, one of said members having a counterbore, the other of said members having a shoulder and a restriction in the passage; a cylinder spaced from the wall of the passage and held at the ends within the counterbore and the restriction respectively; a partition dividing the cylinder into inlet and outlet chambers; said cylinder having a plurality of ports adjacent the end within the counterbore and adjacent the partition in the outlet chamber; and means for clamping said members and said cylinder tightly together.

8. A trap for removing particles from a fluid passed therethrough comprising, in combination a nipple having a tubular portion, a tubular member within and of such smaller external diameter than the bore of the tubular portion of the nipple as to provide a space surrounding the tubular member; ports connecting said space with the bore of the tubular member to provide a fluid passage through the trap; a fluid inlet for the passage, and a pocket within the trap closed except for an opening to said passage between the inlet and the ports, and of a depth considerably greater than the distance between the inlet and the ports and also greater than the diameter of the inlet opening or ports; communication between the space in the nipple surrounding the tubular member and the bore of the tubular member being through said ports only.

HARRY J. BAKER.
CHARLES NESS.